United States Patent [19]
Correll

[11] Patent Number: 5,048,222
[45] Date of Patent: Sep. 17, 1991

[54] CRAB CATCHER

[76] Inventor: Robert P. Correll, P.O. Box 57, Benedict Ave., Benedict, Md. 20612

[21] Appl. No.: 575,669

[22] Filed: Aug. 31, 1990

[51] Int. Cl.⁵ .................. A01K 73/00; A01K 74/00
[52] U.S. Cl. .................................. 43/9.1; 43/27.4; 43/9.8; 43/7; 43/104
[58] Field of Search ............ 43/100, 102, 103, 104, 43/4, 9.1, 9.8, 7, 105, 106, 27.4, 6.5; 114/255

[56] References Cited
U.S. PATENT DOCUMENTS

| | | | |
|---|---|---|---|
| 478,579 | 7/1892 | Dunham | 114/255 |
| 1,777,783 | 10/1930 | Burns et al. | 43/6.5 |
| 2,413,552 | 12/1946 | Ethridge | 43/103 |
| 2,948,980 | 8/1960 | Worcester | 43/9.1 |
| 3,419,990 | 1/1969 | Lewis et al. | 43/6.5 |
| 3,708,906 | 1/1973 | Stein | 43/27.4 |
| 3,786,592 | 1/1974 | Miller et al. | 43/6.5 |
| 3,896,579 | 7/1975 | Benne | 43/27.4 |
| 4,321,766 | 3/1982 | Henderson | 43/27.4 |
| 4,335,534 | 6/1982 | Allred | 43/27.4 |
| 4,509,286 | 4/1985 | John | 43/9.1 |

Primary Examiner—Richard K. Seidel
Assistant Examiner—Jeanne M. Elpel
Attorney, Agent, or Firm—Richard C. Litman

[57] ABSTRACT

A crab catcher for use with baited crab line includes a mesh box cage or basket with an opened end facing in the direction of motion of the boat. It is mounted in a frame alongside a moving boat, just under the water. Crab line is run over two rollers, forming a V shape, positioned above the open end of the basket; the line continues over the basket to a rear guide and off the back end. As the boat moves, crabs feeding on the baited line will let go as they near the surface. They are then swept into the open end of the basket by the flow of water and held there by the current. To increase the chance of entrapment, mesh plates are arranged about the open basket end to form a partial funnel and give a larger efffective opening. The basket lifts out of the frame for emptying it of crabs. The frame, which is adjustable for different sizes of boats, has hooks to go over the gunwales of the boat.

14 Claims, 1 Drawing Sheet

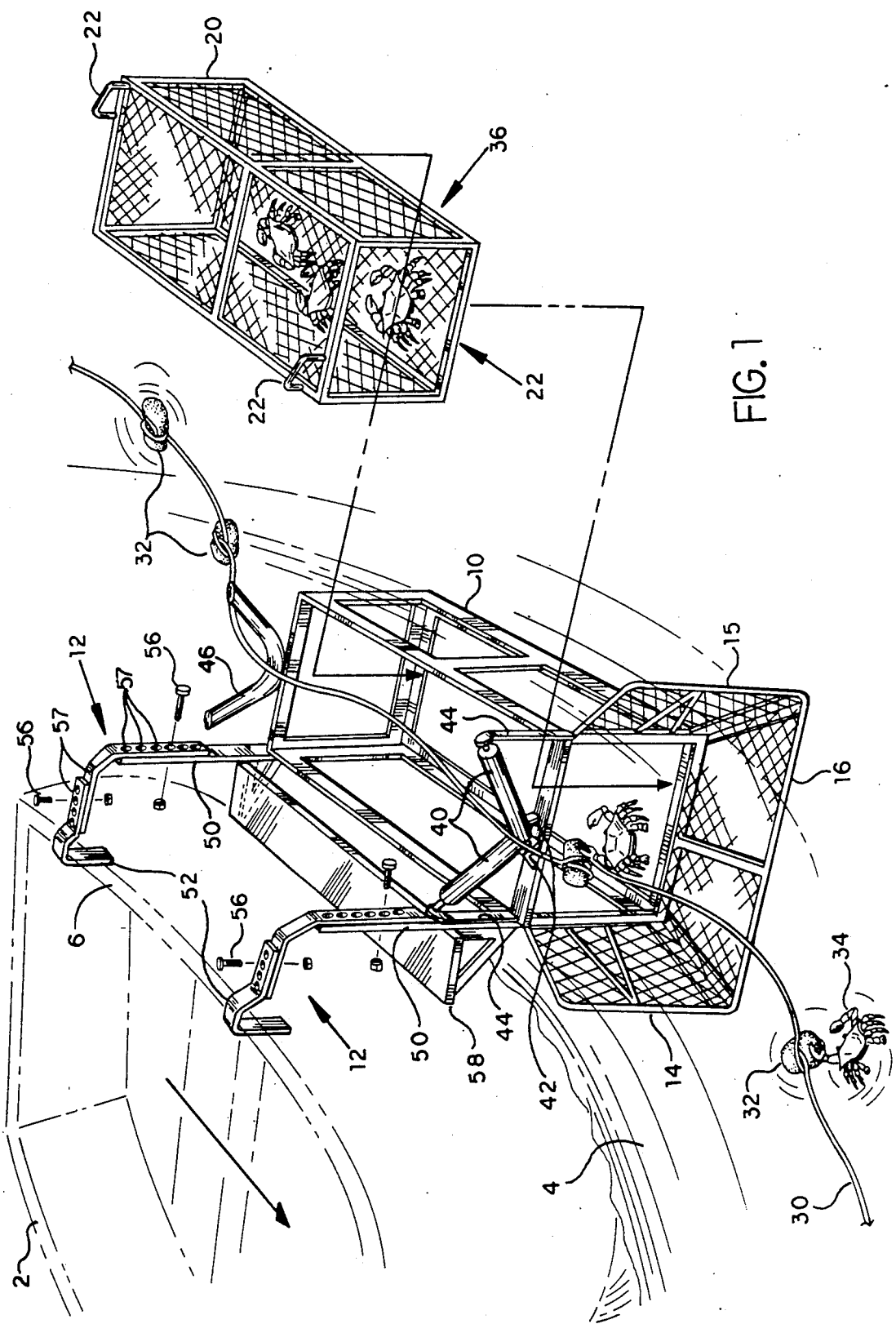

CRAB CATCHER

BACKGROUND OF THE INVENTION

1. Field of the Invention

The present invention relates to devices for catching crabs or the like while crabbing with a baited line.

2. Description of the Prior Art

Crabs are generally caught with either traps, dredges, or baited lines.

Traps are devices, usually baited cages with doors, which are left on the bottom of a body of water where crabs live. Crabs crawl into the cage after the bait, are trapped, and then are hauled up at leisure by means of a rope. In some designs, the trap is sprung by the act of hauling up the trap.

There are numerous patents on crab traps. U.S. Pat. Nos. 3,939,597 of McSherry; 4,765,088 of Stuart; 4,134,226 of Petrella; 4,587,758 of Ponzo; 4,530,182 of Ponzo; 4,654,997 of Ponzo; 4,554,760 of Ponzo; and 3,828,461 of Roberts all show various bottom traps with automatically opening or closing doors.

U.S. Pat. No. 4,406,083 of Hart discloses a spread net which folds over a crab.

Wyman, in U.S. Pat. No. 4,184,283, and Sjolund, in U.S. Pat. No. 4,221,071, teach crab traps with one-way doorways through which crabs can enter but not leave.

U.S. Pat. No. Des. 247,677 of Bockhorn apparently shows a dredge. Such dredges are dragged along the bottom, and the crabs are later separated from the muck and vegetation thus raised.

Rea, in U.S. Pat. No. 3,800,465, shows a mesh basket with an open end or mouth. The basket is made of flexible material which is rigid enough to remain open while on the bottom, but flexible enough that the open mouth may be closed by bending the mesh sides adjacent the opening. (Chicken wire is preferred). A rope is used to drag the basket along the bottom and also to pull it to the surface. The rope is arranged to close the mouth upon raising the basket.

None of the above patents, taken either singly or in combination, is seen to describe the present invention as claimed.

The remaining method of crabbing, by baited line, is traditionally practiced from a boat with a hand net mounted at the end of a pole (resembling a butterfly net). The baited line has bait tied to it at intervals of about 6 feet. The line is slowly raised from the water and crabs which are still feeding on the bait as the line nears the surface are caught with the net, hoisted on board, and put into a container aboard the boat. The crabs sometimes escape with this method, because they release their grip on the bait and the line when they approach the water surface. Thus the net may miss them, especially if the water is murky.

The above technique is sometimes called "dipping" for crabs.

The line used is typically quarter-inch braided nylon, which is often traditionally referred to as "trot line". The bait is salted eel, bull lips, chicken wings, or other inexpensive foods which can be tied to the line and which appeal to crabs.

The line is anchored at both ends and a buoy is attached near the anchored point. The crabber then moves his or her boat from one buoy to the other, collecting crabs along the way.

The baited line has several advantages over traps. The bait is spread easily over a large area with lines; the lines may be 2000 feet or longer from end to end, and crabs will come to the line from some distance on either side. To cover an equivalent area is difficult to do with traps. Traps are heavy and bulky and only a limited number can be stored on a boat. In addition, a line is less expensive than the equivalent number of traps.

The great disadvantage of the baited line has been that the crabs must be individually "dipped" with an awkward net, and laboriously transferred to a container. This requires two hands, which means that other duties, such as steering the boat, must be neglected by the person gathering the crabs. Moreover, this method of crabbing is difficult in rough water. It is also very difficult at night; or when the water is murky, and the crabs are not visible until the last instant before breaking the surface. Thus, there has been a need for an improved method of removing crabs from a baited line.

SUMMARY OF THE INVENTION

One object of the present invention is an improved method of removing crabs from a baited line.

Another object is a way of using a baited line in murky waters or rough waters without loss of crabs.

A further object is a crab catcher that will function automatically and leave the hands free.

These and other objects of the present invention will become readily apparent upon further review of the following specification and drawings.

Accordingly, the present invention comprises an open-mesh box, cage, or basket having one open end. The basket is held alongside a boat, just under the waterline, by a frame which hooks over the gunwales. The open end of the basket is facing in the forward direction so that as the boat moves, water flows in the open end and out through the mesh which forms the walls of the basket.

The top of the basket has rollers at the forward end, directly over the mouth of the forward opening; a line guide is at the trailing edge of the basket. A baited crab line runs over the front rollers, across the top of the basket, and over the rear guide.

As the boat moves forward, the crab line comes up and over the forward roller. Crabs, which are feeding on the bait attached to the line, will let go of the bait on the line as they begin to clear the water. Thus they are dislodged into the opening of the basket. The flow of water into the back of the basket carries the crabs in and traps them in the back of the basket.

The basket has a partial funnel at the open forward end, formed by mesh plates on either side. This partial funnel helps to prevent the crabs from escaping to either side of the opening.

Once the basket is full of crabs, it can be lifted out of the frame by means of handles on the basket top. If the front end is lifted first, the combination of gravity and the forward-to-aft flow of water from the boat's motion trap the sluggish crabs inside. Thus, no door is needed on the basket.

BRIEF DESCRIPTION OF THE DRAWING

FIG. 1 is a partially exploded environmental perspective view of a boat, the frame, the funnel at the front of the frame for gathering crabs, and the basket (shown exploded out of the frame).

DETAILED DESCRIPTION OF THE PREFERRED EMBODIMENT

FIG. 1 shows the present invention in its environment of use. A boat 2 is moving forward through the water 4. Over the gunwale 6 of the boat 2 hang the adjustable hangers 12 of the frame 10. The frame 10 is welded of steel stock, preferably stainless. Plastic could also be used for lightness.

A box cage or basket 20 is shown in FIG. 1 suspended in the air adjacent the frame. In use, the basket will have been moved from the position shown down into the frame 10, which is adapted to accept the basket from above and to hold it in the position of use. In that position, the top of the basket is at the level of the water surface. In other words, when the basket 20 is in its position of use, the upper surface of the basket 20 is level with the undisturbed surface of the water surrounding the boat. The undisturbed surface is the surface when no waves are present, or alternatively, the average surface when waves are present.

Each adjustable hanger 12 further comprises an upright 50, welded to the frame 10, and a hook 52. Bolt 56 fastened through holes 57 in both hook and upright allow for adjustably attaching the two parts so as to fit boats of varying freeboard.

A standoff board 58, mounted to the uprights 50, prevents the frame 10 from abrading the boat's side, and hold the frame in the proper position.

The basket 20 must be emplaced into the frame 10 so that the open mouth or end 22 of the basket is toward the bow of the boat. When the basket 20 is inserted fully into the frame 10, there is only a small gap between the basket and the funnel plates 14, 15, 16 of the frame 10. These funnel plates serve to prevent the escape of crabs in the vicinity of the basket mouth.

The baited crab line 30 consists of light braid, rope, or monofilament. Nylon and manila line are typical materials for the crab line. Pieces of bait 32 are tied into the line at intervals. In FIG. 1 a crab 34 holds to bait on the line 30.

The line 30 comes out of the water 4 and runs over a set of two rollers 40 each set at 45 degrees to the top of the frame. The two rollers are set close to each other but do not touch. The rollers may be made of wood, plastic, or similar materials. Metals rollers are less suitable because they are noisy. The rollers should be about two inches in diameter. If much smaller, they are liable to catch on the pieces of bait tied to the line. The bait 32, which may be salted eel, bull lips, or chicken wings, is of such a size that it would catch on rollers of too small a diameter.

The rollers 40 are supported by frame extensions 42 and 44. They may be set onto roller bearings or the like to reduce friction.

Other arrangements of rollers are possible. For example, three rollers could be used, with one horizontal and two vertical on either side. Or a simple fixed line guide could be used.

After extending across the top of the basket 20, the line 30 passes over an after guide 46 at the after end of the frame 10 and back into the water. The after guide 46 is a curved length of steel tubing with a diameter of about two inches, welded to the frame 10. Alternatively, the after guide could be constructed of other materials, such as plastic tubing, or, include rollers as an alternative to fixed tubing.

The curvature of the after guide 46 prevents the line 30 from escaping from the concave section and fouling against the frame 10, the boat's propeller, or the like.

The basket 20 is rectangular, of dimensions to fit the opening in the frame 10, and has an open mesh structure with mesh openings of such a size that the crabs cannot escape, but water can freely flow through the basket. Thus the boat's motion is not obstructed greatly, as it would be by a basket with solid sides, and the crabs are trapped in constantly-renewed water. The basket is preferably made of polyurethane mesh fastened with ordinary nylon cable ties over a basket frame welded of steel angle and flat stock. The basket frame could also be molded in plastic, for lightness.

The basket may be of any suitable size. Typical dimensions might be 60 inches long and 12 to 18 inches deep.

In operation, the motion forward of the boat 2 causes the line 30 to move up out of the water 4 and over the rollers 40, across the top of the basket 20, and on back through the after guide 46, whence it returns to the water 4.

Crab 34 attached to the line 30 will hold onto the bait 32 until it is close to the surface of the water 4; as the crab 34 nears the surface it will release its grip. At this time the crab 34 will be near to the open mouth of the basket 20. Because of the forward motion of the boat, the crab 34 will be carried by the water into the basket 20 to join the caught crabs 36 shown inside the basket. The funnel plates 14, 15, 16 prevent the crab 34 from escaping to either side or below.

The two side funnel plates 14 and 15 diverge to the port and starboard sides, and the funnel plate 16 is horizontal. The plates 14 and 15 preferably make an angle of about 35 degrees to fore-and-aft lines extending along the sides of the basket 20 or frame 10. The top edges of the plates 14 and 15 should be level with the top of the basket 20. It will be understood from the drawings, and upon reflection, that the plates 14 and 15 each have the shape of a rectangle, and, that plate 16 is a trapezoid.

The plates 14, 15, and 16 are jointly fastened at their mutual edges. They are made of mesh material over a frame as is the basket 20. This again insures that the boat does not experience great hydraulic drag in moving through the water, as it would if the plates were of solid material.

The basket 20 has handles 22 for lifting and lowering the basket in and out of the opening in the frame 10. When the basket becomes full of crabs 36 (the catcher as shown holds two and one half bushels of crabs) it may be lifted out of the frame 10 and the crabs transferred to a suitable container aboard the boat 2. If the basket 20 is tilted up as it is lifted up and out of the frame, the combination of water flow and gravity will prevent any crabs from escaping.

It is to be understood that the present invention is not limited to the sole embodiment described above, but encompasses any and all embodiments within the scope of the following claims. In particular, the crab catcher may be used to gather various crustaceans or other aquatic animals, including surface animals.

I claim:

1. An aquatic animal catcher for mounting to a boat under and adjacent to the surface of the water next to the boat, comprising:

an elongated mesh basket having an open end, said open end facing in the direction of motion of the boat;

a frame for mounting said basket to the boat, said frame adapted to removably hold said basket in position; and means for guiding a baited line along a path above said open end as the boat moves, whereby aquatic animals feeding on the baited line may be swept into said open end of said basket and held therein by the motion of the boat and said basket may be lifted away from said frame when full.

2. An aquatic animal catcher as in claim 1 including handles attached to said basket for removing said basket from said frame.

3. An aquatic animal catcher as in claim 1 wherein said basket is rectangular in cross section.

4. An aquatic animal catcher as in claim 3 including side and bottom mesh funnel plates attached to said frame adjacent said open end of said basket, said funnel plates angled to the sides of said basket, said plates mutually joined along adjacent edges, and adapted to move animals into said basket as the boat moves forward.

5. An aquatic animal catcher for mounting to a boat under and adjacent to the surface of the water next to the boat, comprising:

an elongated mesh basket having an open end, said open end facing in the direction of motion of the boat;

a frame for mounting said basket to the boat; and means for guiding a baited line along a path above said open end as the boat moves, said means for guiding including two rollers disposed adjacent one another having overlapping ends, having skew axes, and set at angles, said rollers having diameters adapted to pass the line and bait attached thereto freely over said rollers, whereby aquatic animals feeding on the baited line may be swept into said open end of said basket and held therein by the motion of the boat.

6. An aquatic animal catcher as in claim 5 including an after guide mounted to said frame abaft said rollers for guiding the line, whereby the line is prevented from fouling.

7. An aquatic animal catcher as in claim 5 wherein there are exactly two rollers having respective axes, each axis set essentially at 45 degrees to the horizontal, the axes essentially at right angles to one another, and each axis essentially at right angles to the direction of motion of the boat.

8. An aquatic animal catcher as in claim 7 including an after guide mounted to said frame abaft said rollers for guiding the line, whereby the line is prevented from fouling.

9. An aquatic animal catcher, for mounting to a boat, comprising:

an elongated mesh basket having one open end, said open end facing in the direction of motion of the boat, said basket having an upper surface;

a frame, mountable on the boat, said frame adapted to hold said basket adjacent the boat so that said upper surface of said basket is level with the undisturbed surface of the water surrounding the boat;

means for removably mounting said frame onto the boat;

means for guiding a baited line along a path above said open end as the boat moves, whereby aquatic animals feeding on the baited line may be swept into said open end of said basket and held therein under water by the motion of the boat.

10. An aquatic means catcher as in claim 9 wherein said means for mounting includes hangers for hanging said frame over the gunwales of a boat.

11. An aquatic animal catcher as in claim 10 wherein said hangers are adjustable to fit boats of various freeboard heights and gunwale widths.

12. An aquatic animal catcher as in claim 9 wherein said means for guiding includes at least one revolvable roller having a diameter adapted to pass the line and bait attached thereto freely over said roller.

13. An aquatic animal catcher as in claim 12 including an after guide mounted to said frame abaft said roller for guiding the line, whereby the line is prevented from fouling.

14. An aquatic animal catcher as in claim 9 including a mesh funnel surrounding said open end for gathering animals into said open end of said basket.

* * * * *